US012757826B2

(12) United States Patent
Fasick et al.

(10) Patent No.: US 12,757,826 B2
(45) Date of Patent: Oct. 13, 2026

(54) SELF-PROPELLED ENGINE OVERSPEED CONTROL

(71) Applicants: CNH Industrial America LLC, New Holland, PA (US); CNH Industrial Belgium N.V., Zedelgem (BE)

(72) Inventors: Gregory Fasick, Mohnton, PA (US); Kevin Hanson, Akron, PA (US); Michael Carpentier, Varsenare (BE)

(73) Assignees: CNH Industrial America LLC, New Holland, PA (US); CNH industrial Belgium N.V.

( * ) Notice: Subject to any disclaimer, the term of this patent is extended or adjusted under 35 U.S.C. 154(b) by 834 days.

(21) Appl. No.: 18/103,851

(22) Filed: Jan. 31, 2023

(65) Prior Publication Data

US 2024/0251710 A1 Aug. 1, 2024

(51) Int. Cl.
*A01D 41/127* (2006.01)
*A01D 69/00* (2006.01)
(Continued)

(52) U.S. Cl.
CPC ....... *A01D 41/1274* (2013.01); *A01D 69/005* (2013.01); *A01D 69/03* (2013.01);
(Continued)

(58) Field of Classification Search
CPC .. A01D 41/1274; A01D 69/005; A01D 69/03; A01D 69/08; B60K 7/0015; B60K 17/14; B60K 17/28
See application file for complete search history.

(56) References Cited

U.S. PATENT DOCUMENTS 3,999,386 A * 12/1976 Crull .................... F16H 61/465
60/431
8,781,694 B1 * 7/2014 Sheidler
(Continued)

FOREIGN PATENT DOCUMENTS

DE 10304917 A1 8/2004

OTHER PUBLICATIONS

The Extended European Search Report issued Jun. 10, 2024, by the European Patent Office in corresponding European Patent Application No. 24 154 642.3. (7 pages).

*Primary Examiner* — James A Shriver, II
*Assistant Examiner* — Nicholas R. Kandas
(74) *Attorney, Agent, or Firm* — Buchanan Ingersoll & Rooney PC

(57) ABSTRACT

A method for operating an agricultural vehicle, the method including: generating an overdrive torque at a drive wheel motor of at least one ground drive system; transmitting the overdrive torque to the engine via a hydraulic ground drive circuit and a ground drive pump, to thereby bias the engine to operate at an increased rotation speed; measuring an engine rotation speed; comparing the engine rotation speed to a threshold value; and upon determining that the engine rotation speed satisfies the threshold value, operating the auxiliary hydraulic component of an auxiliary hydraulic system to generate a braking torque at a respective auxiliary pump, and transmitting each the braking torque to the engine to bias the engine to operate at a decreased rotation speed. An agricultural vehicle having a control system to perform the method is also provided.

11 Claims, 4 Drawing Sheets

(51) Int. Cl.

| | |
|---|---|
| ***A01D 69/03*** | (2006.01) |
| ***A01D 69/08*** | (2006.01) |
| ***B60K 7/00*** | (2006.01) |
| ***B60K 17/14*** | (2006.01) |
| ***B60K 17/28*** | (2006.01) |

(52) U.S. Cl.

CPC ............ *A01D 69/08* (2013.01); *B60K 7/0015* (2013.01); *B60K 17/14* (2013.01); *B60K 17/28* (2013.01)

(56) References Cited

U.S. PATENT DOCUMENTS

| | | | | |
|---|---|---|---|---|
| 9,458,842 | B2 * | 10/2016 | Berg | F04B 17/05 |
| 12,515,591 | B1 * | 1/2026 | Smith | B60R 5/04 |
| 2016/0017570 | A1 | 1/2016 | Miyamoto et al. | |
| 2021/0001923 | A1 * | 1/2021 | Fay, II | B60T 11/21 |
| 2021/0047790 | A1 | 2/2021 | Ishida et al. | |
| 2021/0310502 | A1 | 10/2021 | Babbitt et al. | |

* cited by examiner

SELF-PROPELLED ENGINE OVERSPEED CONTROL

FIELD OF THE INVENTION

The present invention relates to agricultural vehicle drive systems, and particularly hydraulic drive systems.

BACKGROUND OF THE INVENTION

Many agricultural vehicles include hydrostatic drive systems for transferring power from an internal combustion engine to operating mechanisms. Such operating mechanisms can take various forms, such as drive wheels, movable headers and the like, windrowers, spreaders, cutters, threshers, sieves, and so on. A hydrostatic drive system typically includes a hydraulic fluid reservoir, one or more drive pumps, and various hydrostatic circuits, motors and actuators dedicated to operating individual mechanisms or groups of mechanisms.

Hydrostatic drive systems can, in some cases, be subject to overspeed loads that bias the motor or actuator to continue moving in the drive direction, even when it is not desired. For example, when a vehicle driven by hydrostatic drive wheels travels downhill, gravity can apply a force that tends to pull the vehicle faster than the intended drive speed. When this happens, the overspeed load is transferred, via the drive wheel motor, back into the hydrostatic circuit, and then to the hydrostatic drive pump and the engine to which the pump is connected. The overspeed load can cause the hydrostatic drive pump and engine to accelerate to a speed that causes damage to the engine and other parts.

The overspeed load is resisted by the internal friction of the engine and hydrostatic drive pump, and potentially by other components within and external to the hydrostatic drive system, which absorb the excess power caused by the overspeed loads. For example, the engine may be equipped with an exhaust brake that selectively increases the engine's resistance to rotation, or the pump may include a dedicated power mitigation device. However, such devices can be costly, and may not provide sufficient power absorption to keep the engine overspeed amount at an acceptable level.

SUMMARY OF THE INVENTION

In one exemplary embodiment, there is provided a method for operating an agricultural vehicle. The agricultural vehicle includes: a chassis; an engine mounted to the chassis; at least one ground drive system, and at least one auxiliary hydraulic system. The at least one ground drive system includes: a respective ground drive pump configured to be driven by the engine, one or more respective ground drive assemblies configured to support and selectively drive the chassis on a ground surface, each respective ground drive assembly comprising a respective drive wheel and a respective drive wheel motor, and a respective hydraulic ground drive circuit configured to convey hydraulic fluid between the respective ground drive pump and the respective drive wheel motor. The at least one auxiliary hydraulic system includes: a respective auxiliary pump configured to be driven by the engine, a respective driven auxiliary mechanism configured to be operated by the respective auxiliary pump, a respective auxiliary hydraulic circuit configured to convey a respective auxiliary flow of hydraulic fluid between the respective auxiliary pump and the respective driven auxiliary mechanism, and a respective auxiliary hydraulic component located in the auxiliary hydraulic circuit. The method comprises: generating a respective overdrive torque at the respective drive wheel motor of at least one ground drive system; transmitting each respective overdrive torque to the engine via the respective hydraulic ground drive circuit and the ground drive pump, to thereby bias the engine to operate at an increased rotation speed; measuring an engine rotation speed; comparing the engine rotation speed to a threshold value; and, upon determining that the engine rotation speed satisfies the threshold value: operating the respective auxiliary hydraulic component of at least one auxiliary hydraulic system to generate a respective braking torque at the respective auxiliary pump, and transmitting each respective braking torque to the engine to bias the engine to operate at a decreased rotation speed.

In another exemplary embodiment, there is provided an agricultural vehicle having: a chassis; an engine mounted to the chassis; at least one ground drive system; at least one auxiliary hydraulic system, and a control system. The at least one ground drive system includes: a respective ground drive pump configured to be driven by the engine, one or more respective ground drive assemblies configured to support and selectively drive the chassis on a ground surface, each respective ground drive assembly comprising a respective drive wheel and a respective drive wheel motor, and a respective hydraulic ground drive circuit configured to convey hydraulic fluid between the respective ground drive pump and the respective drive wheel motor. The at least one auxiliary hydraulic system includes: a respective auxiliary pump configured to be driven by the engine, a respective driven auxiliary mechanism configured to be operated by the respective auxiliary pump, a respective auxiliary hydraulic circuit configured to convey a respective auxiliary flow of hydraulic fluid between the respective auxiliary pump and the respective driven auxiliary mechanism, and a respective auxiliary hydraulic component located in the auxiliary hydraulic circuit. The control system includes a processor and a memory that stores non-transient instructions that, when executed by the processor, control the vehicle to: measure an engine rotation speed; compare the engine rotation speed to a threshold value; and upon determining that the engine rotation speed satisfies the threshold value: operate the respective auxiliary hydraulic component of at least one auxiliary hydraulic system to generate a respective braking torque at the respective auxiliary pump, and transmit each respective braking torque to the engine to bias the engine to operate at a decreased rotation speed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
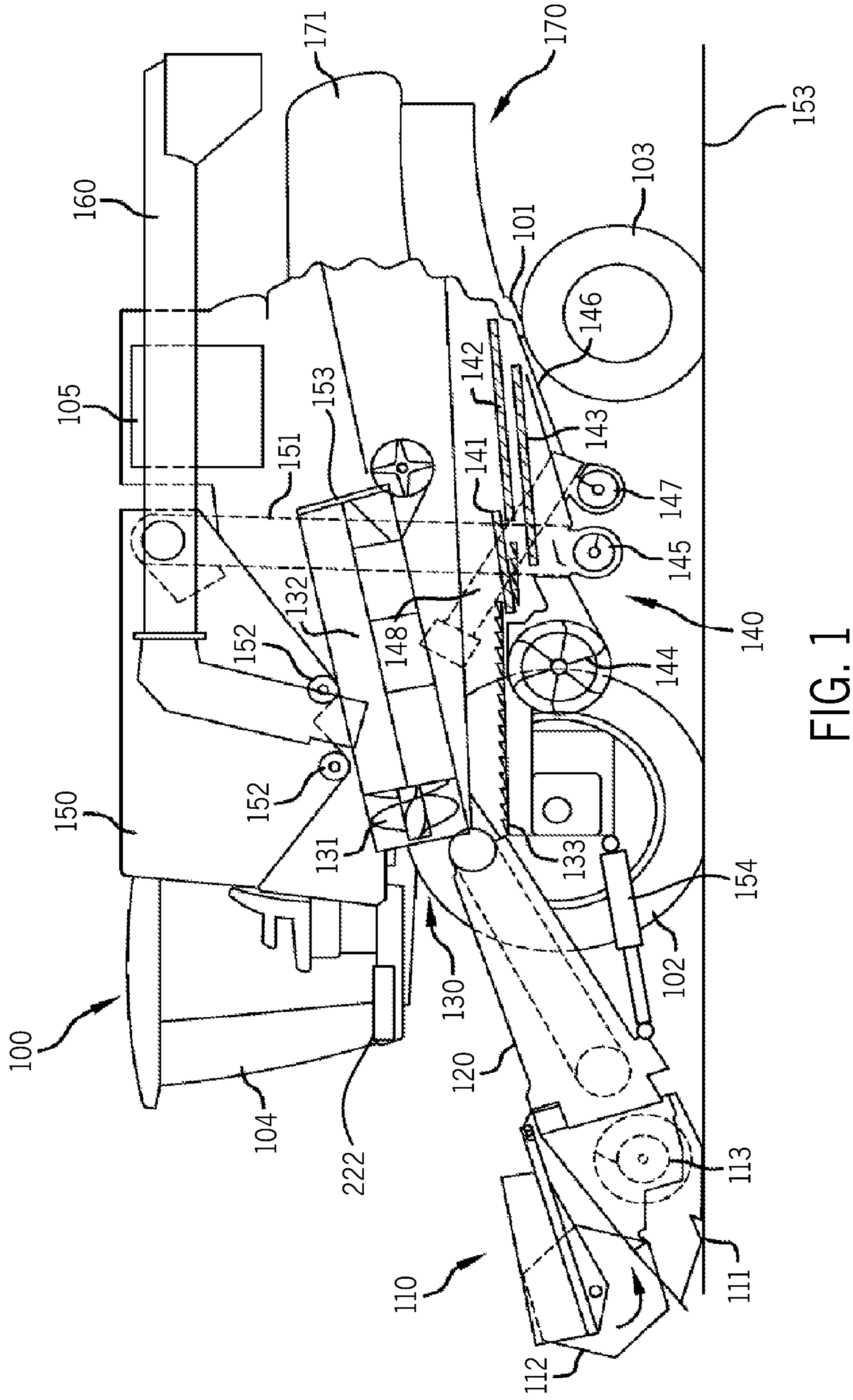
FIG. 1 is a schematic side view of a first agricultural vehicle incorporating embodiments of a control system configured to operate the method for controlling engine overspeed.

The figures depict the elements in schematic form and are not necessarily to scale.

DETAILED DESCRIPTION

Corresponding reference characters indicate corresponding parts throughout the several views. The embodiments described herein are only examples, and are not to be construed as limiting the scope of the invention in any manner.

Inasmuch as various components and features of agricultural vehicles and systems are of well-known design, construction, and operation to those skilled in the art, the details of such components and their operations will not generally be discussed in significant detail unless considered of pertinence to the present invention or desirable for purposes of better understanding.

FIG. 1 illustrates an example of an agricultural vehicle in the form of a combine 100, in which embodiments of the invention may be incorporated. The combine 100 includes a chassis 101, wheels 102 and 103 that support the chassis 101 on the ground 153, a header 110, a feeder assembly 120, an operator cab 104, a threshing and separating system 130, a cleaning system 140, a grain tank 150, and an unloading auger 160. The front wheels 102 typically are the drive wheels, and may comprise, for example, two, four, or more larger flotation type wheels. The rear wheels 103 typically are smaller than the front wheels 102, and are steerable. Motive force is selectively applied to the front wheels 102 by a power plant, such as a diesel engine 105, and a gearbox. The front or rear wheels 102, 103 in some cases may be tracked wheel assemblies.

The header 110 is mounted to the front of the combine 100, and includes a cutter 111 (e.g., a cutter bar) for severing crops from a field during forward motion of the combine 100. A rotatable reel 112 feeds the crop into the header 110, and augers 113 or draper belts feed the severed crop laterally inwardly from each side toward the feeder assembly 120. The feeder assembly 120 conveys the cut crop to the threshing and separating system 130, and is selectively vertically movable using appropriate actuators 154, such as hydraulic cylinders.

The threshing and separating system 130 is of the axial-flow type, and includes a threshing rotor 131 that is at least partially enclosed by a rotor cage 200 (FIG. 2), and rotatable within a corresponding perforated concave 132. The cut crop material is threshed and separated by the rotation of the rotor 131 within the concave 132, and larger elements, such as stalks, leaves and the like are discharged from the rear of the combine 100. Smaller elements of crop material including grain and non-grain crop material, including particles lighter than grain, such as chaff, dust and straw, are discharged through perforations of the concave 132.

Grain separated from the remaining crop material by the threshing and separating assembly 130 falls onto a grain pan 133 and is conveyed toward the cleaning system 140. The cleaning system 140 may include devices such as a pre-cleaning sieve 141, an upper sieve 142 (also known as a chaffer sieve or sieve assembly), a lower sieve 143 (also known as a cleaning sieve), and a cleaning fan 144. Grain and other crop material on the sieves 141, 142 and 143 is subjected to a cleaning action by the fan 144 which provides an air flow through the sieves to remove chaff and other impurities such as dust from the grain by making this material airborne. The separated material is discharged through a straw hood 171 of a residue handling system 170 of the combine 100. The grain pan 133 and the pre-cleaning sieve 141 may oscillate in a fore-to-aft manner to transport the grain and finer non-grain crop material to the upper surface of the upper sieve 142. The upper sieve 142 and the lower sieve 143 are vertically arranged relative to each other, and likewise may oscillate in a fore-to-aft manner to spread the grain across the sieves 142, 143, while permitting the passage of cleaned grain by gravity through openings through the sieves 142, 143.

Clean grain falls to a clean grain auger 145 positioned crosswise below and toward the front of the lower sieve 143. The clean grain auger 145 receives clean grain from each sieve 142, 143 and from a bottom pan 146 of the cleaning system 140. The clean grain auger 145 conveys the clean grain laterally to a generally vertically arranged grain elevator 151 for transport to grain tank 150. Tailings from the cleaning system 140 fall to a tailings auger trough 147. The tailings are transported via a tailings auger 147 and a return auger 148 to the upstream end of the cleaning system 140 for repeated cleaning action. A pair of grain tank augers 152 at the bottom of the grain tank 150 convey the clean grain laterally within the grain tank 150 to the unloading auger 160 for discharge from the combine 100.

Any number of the operating mechanisms may be driven by a hydraulic drive, such as a linear actuator (i.e., telescoping piston and cylinder assembly), rotary motor or the like. For example, linear actuators may be used to reposition the header 110, concave 132, or sieves 141, 142, 143, and so on. Similarly, rotary motors may be used to drive the reel 112, augers 113, 145, 147, infeed belt, fan 144, threshing rotor 131, and so on.

In some circumstances, an agricultural vehicle 100 such as described above can enter a condition in which overspeed loads apply a load to bias the engine 105 to operate at an undesirably fast rotation speed. This can happen when the vehicle is operated on a slope, when the vehicle attempts to slow while managing a load (e.g., a grain load or trailer equipment), or when it is desired to rapidly slow the vehicle. The inventors have determined that such overspeed loads can be counteracted using existing features of existing hydraulic systems of the vehicle 100, without having to modify the existing hydraulic systems or incorporate additional braking or flow control devices. The following examples describe how such overspeed loads may be counteracted using existing hydraulic systems.

Figure 2:
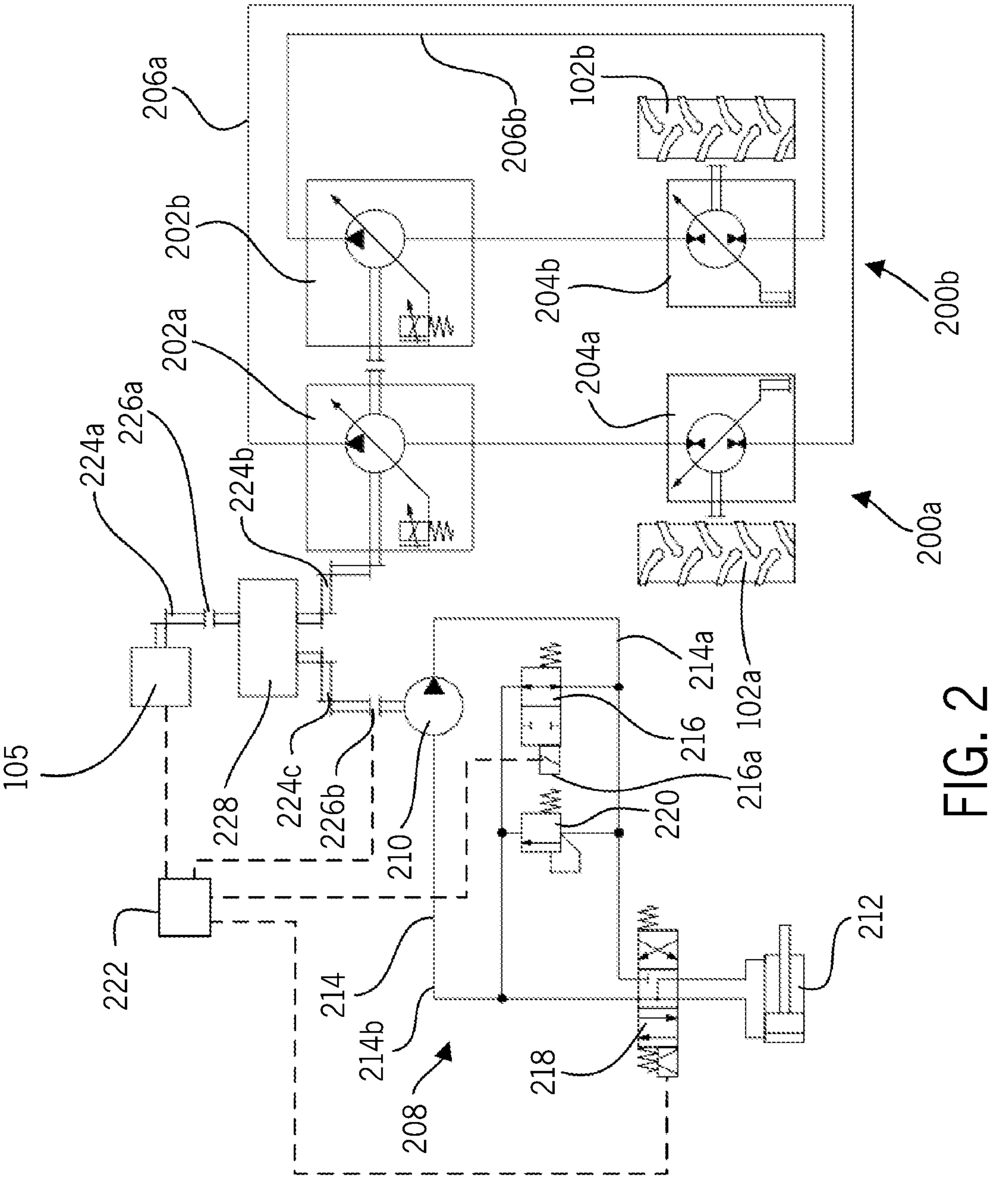
FIG. 2 is an exemplary power delivery system for an agricultural vehicle.

FIG. 2 illustrates an example of an agricultural vehicle power delivery system. The system includes a ground drive system including the engine 105, wheels 102, and various components to deliver power from the engine 105 to the wheels 102. In this case, the engine 105 is configured to drive two ground drive systems 200*a*, 200*b*. Each ground drive system 200*a*, 200*b* includes a ground drive pump 202*a*, 202*b*, a ground drive assembly including a wheel 102*a*, 102*b* and a drive wheel motor 204*a*, 204*b*, and a hydraulic ground drive circuit 206*a*, 206*b* configured to convey hydraulic fluid between the ground drive pump 202*a*, 202*b* and the respective drive wheel motors 204*a*, 204*b*. As noted above, the wheels 102*a*, 102*b* may have any suitable construction (e.g. tracked or not tracked). Similarly, the ground drive pumps 202*a*, 202*b*, drive wheel motors 204*a*, 204*b* and hydraulic ground drive circuits 206*a*, 206*b* may have conventional constructions, as known in the art. In this example, there are two driven wheels 102, but the system may be expanded to include additional driven wheels 102, as known in the art. Other alternatives and embodiments will be apparent to persons of ordinary skill in the art in view of the present disclosure.

The power delivery system also incudes one or more auxiliary hydraulic systems 208, each of which includes an auxiliary pump 210 configured to be driven by the engine 105, a driven auxiliary mechanism 212 configured to be operated by the auxiliary pump 210, and an auxiliary hydraulic circuit 214 configured to convey hydraulic fluid between the auxiliary pump 210 and the driven auxiliary mechanism 212. In this case, the driven auxiliary mechanism 212 is a linear actuator, but in other cases it may be a rotary motor or the like. The driven auxiliary mechanism 212 may be connected to any driven system in the vehicle. For example, the driven auxiliary mechanism 212 may be a feeder housing actuator 154 as described above, a hydraulic motor connected to drive an infeed belt, auger or thresher, and so on. A single auxiliary hydraulic system 208 also may include multiple driven auxiliary mechanisms 212, such as a group of linear actuators or rotary motors. Other variations will be readily apparent in view of this disclosure.

The auxiliary hydraulic system 208 may include any controls and features suitable for operating the driven auxiliary mechanisms 212. In the shown example, the auxiliary hydraulic circuit 214 includes a delivery line 214*a* connected between an output of the auxiliary pump 210 and an input of the driven auxiliary mechanism 212, and a return line 214*b* connected between an input of the auxiliary pump 210 and an output of the driven auxiliary mechanism. A bypass valve 216 is located between the delivery line and the return line in fluid parallel with the driven auxiliary mechanism 212. The bypass valve 216 may comprise, for example, a two-position valve that is operated by a solenoid 216*a*, a manual lever, or the like. The bypass valve 216 is movable between an open position (shown) to provide a direct flow passage from the delivery line 214*a* to the return line 214*b*, and a closed position in which it does not provide a direct flow passage between the delivery line 214*a* and the return line 214*b*. In the open position, the bypass valve 216 allows pressurized fluid in the delivery line 214*a* to pass to the return line 214*b* without applying an appreciable motive force to the driven auxiliary mechanism 212, which disables the driven auxiliary mechanism 212 from operating. Thus, the bypass valve 214 is placed in the open position when it is not desired to use the driven auxiliary mechanism 212, to thereby allow the auxiliary pump 210 to rotate without generating an operating force on driven auxiliary mechanism 212. Conversely, placing the bypass valve 212 in the closed position allows the remainder of the delivery line 214*a* to convey (or be configured to convey) pressurized fluid to the driven auxiliary mechanism 212 to enable operation thereof.

The auxiliary hydraulic circuit 214 also includes a control valve 218 located in series between the auxiliary pump 210 and the driven auxiliary mechanism 212. The control valve 218 is movable between a closed position (shown) in which the control valve 218 prevents hydraulic fluid from passing from the auxiliary pump 210 to the driven auxiliary mechanism 212, and an open position in which the control valve 218 allows hydraulic fluid to pass from the auxiliary pump 210 to the driven auxiliary mechanism 212. The control valve 218 is used to control the operation of the driven auxiliary mechanism 212 when the bypass valve 216 is in the closed position. The control valve 218 may be a simple two position valve, a three-position (reversing) valve, or any other suitable valve for the circumstances. In this case, the control valve 218 is a three-position valve that has two different open positions (forward and reverse), to allow the driven auxiliary mechanism 212—shown as a double-acting hydraulic piston and cylinder assembly—to be alternately extended and contracted. Other alternatives and embodiments will be apparent to persons of ordinary skill in the art in view of the present disclosure.

It will be understood that, in this description and in the claims, the terms "delivery" and "return" are used as nominal terms to more easily identify the parts. In cases in which the auxiliary pump 210 is a one-way pump, the delivery line 214*a* will only be used to deliver hydraulic fluid, and the return line 214*b* will only be used to return the fluid to the pump 210. If the one-way pump is replaced by a two-way (reversible) pump, then the delivery line 214*a* and return line 214*b* will both be able to deliver and return hydraulic fluid, depending on the rotation direction of the pump 210. Similar understandings shall also be applied to terms such as "inlet" and "outlet" (i.e., an "inlet" may act as an outlet under some circumstances, and an "outlet" may act as an inlet under some circumstances).

The auxiliary hydraulic system 208 also includes an auxiliary hydraulic component 220 that is configured to generate a braking force, when desired, to counteract an overspeed load that is applied to the engine 105. In this case, the auxiliary hydraulic component 220 is a pressure relief valve 220 that is located between the delivery line 214*a* and the return line 214*b*, in fluid parallel to the driven auxiliary mechanism 212. The pressure relief valve 220 conveniently is a pre-existing component of the auxiliary hydraulic system 208. For example, in this case, the pressure relief valve 220 is provided in the auxiliary hydraulic circuit 208 as a safety feature that is used during operation of the auxiliary hydraulic circuit 208 independently of the use to generate a braking load, as described herein. In other cases, the auxiliary hydraulic component 220 may comprise any other type of pre-existing component that can generate a continuous braking load on the auxiliary pump 210 (e.g. drive motors or the like).

The power delivery system also may include a driveline having various elements to drivingly connect the engine 105 to the pumps 202*a*, 202*b*, 210. In this case, the driveline includes a main drive shaft 224*a* connecting the engine 105 to a gearbox 228, a ground drive shaft 224*b* connecting the gearbox 228 to the ground drive pumps 202*a*, 202*b*, and an auxiliary drive shaft 224*c* connecting the gearbox 228 to the auxiliary pump 210. It will be appreciated that each "drive shaft" may include multiple shafts, gears, and the like that are configured to convey drive torque between the stated elements. The gearbox 228 may include reduction gears to synchronize the rotation speeds of the engine 105, ground drive pumps 202*a*, 202*b* and auxiliary pump 210 at any desired ratio. The gearbox 228 also may include variable or reconfigurable gears to manually or automatically change the gear ratios of the various drive shafts 224*a*, 224*b*, 224*c*.

One or more of the drive shafts 224*a*, 224*b*, 224*c* also may include a clutch to selectively terminate torque transfer through the drive shaft 224*a*, 224*b*, 224*c*. For example a main clutch 226*a* may be provided in the main drive shaft 226 to completely disengage the engine 105 from the remainder of the system, and an auxiliary clutch 226*b* to disengage the auxiliary pump 210 from the gearbox 228. In this example, there is no clutch between the gearbox 228 and the ground drive pumps 202*a*, 202*b*. In other cases the one or both of the main clutch 226*a* and auxiliary clutch 226*b* may be removed, or additional clutches may be added at other locations.

Figure 3:
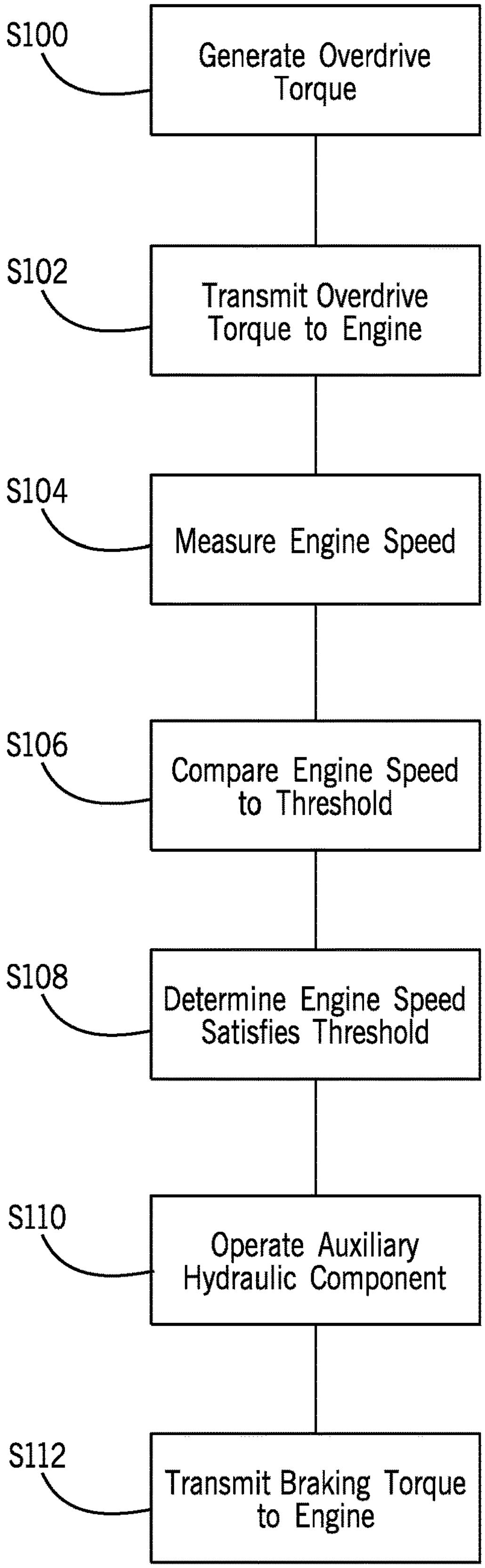
FIG. 3 is a flowchart illustrating an exemplary method for controlling engine overspeed in an agricultural vehicle.

Referring now to FIG. 3, methods for generating a braking load to counteract and undesirable overspeed condition are described in detail.

The first step S100 of the method comprises generating an overdrive torque at one or more of the drive wheel motors 204*a*, 204*b*. As noted above, an undesirable overspeed condition can occur when forces on the vehicle 100 generate an overspeed torque on the wheels 102*a*, 102*b*. This condition can be created in various predictable ways, such as by operating the vehicle 100 on a slope or with a large load, or in unpredictable ways, such as when an emergency stop is required. In these cases, inertia or gravity acts on the mass of the vehicle 100, and friction between the wheels 102*a*, 102*b* and the ground generate an overdrive torque on the respective drive wheel motors 204*a*, 204*b*.

In step S102, the overdrive torque at each drive wheel motor 204*a*, 204*b* is transmitted to the engine 105 by the respective hydraulic ground drive circuit 206*a*, 206*b*. This happens when the drive wheel motors 204*a*, 204*b* are biased to rotate faster than they are driven by the incoming pressurized hydraulic fluid, which generates a higher pressure on the hydraulic fluid exiting the motor than on the fluid entering the motor (i.e., the motors 204*a*, 204*b* transition from operating as a driven motor to operating as a driving pump). At this point, the high-pressure hydraulic fluid leaving the motors 204*a*, 204*b* transfers the overdrive torque to the ground drive pumps 202*a*, 202*b*, and the ground drive pumps 202*a*, 202*b* transmit the overdrive torque to the engine 105 via any intervening driveline (discussed below). The overdrive torque thus biases the engine 105 to operate at an increased rotation speed.

In step S104, the engine speed of the engine 105 is measured. This may be done manually or automatically. For example, a user may manually observe a mechanical or digital tachometer that indicates the engine speed, or a control system 222 may be used to automatically detect the engine speed using digital tachometers (e.g., Hall-effect sensors or other known mechanisms).

In step S106, the measured engine speed is compared to a threshold value. This may be done manually by comparing the observed value to a predetermined value (e.g., a "redline" on the tachometer or the like), or automatically by the control system 222 using lookup tables or basic comparison algorithms using a predetermined threshold value (e.g., 3,000 rpm).

In step S108, it is determined that the engine rotation speed satisfies the threshold value. The threshold value determination may be done by determining that the engine speed meets or exceeds a fixed value, or by other means. For example, the threshold may be a measure of engine speed over time to determine an acceleration trend, a rolling average of engine speed to satisfy the threshold when the actual engine speed or a time average of the engine speed meets the threshold for a certain period of time, and so on.

In step S110, the auxiliary hydraulic component 220 is operated to generate a braking torque at the auxiliary pump 210. The auxiliary hydraulic component 220 may be activated in various ways. For example, in the embodiment of FIG. 2, the auxiliary hydraulic system 208 may be controlled to place the bypass valve 216 and the control valve 218 in their respective closed positions. In this state, the pressure relief valve 220 generates backpressure against the fluid in the auxiliary hydraulic circuit 214 equivalent to the bypass pressure of the pressure relief valve 220. This backpressure generates a braking force on the auxiliary pump 210.

In another example, the auxiliary hydraulic component 220 may be activated by engaging the auxiliary clutch 226*b*. For example, in the embodiment of FIG. 2, the bypass valve 216 may be placed in the closed position (or simply omitted), the control valve 218 may be placed in the closed position, and the clutch may be engaged to connect the auxiliary pump 210 to the gearbox 228 and thus transfer the braking torque to the engine 105. Other alternatives and embodiments will be apparent to persons of ordinary skill in the art in view of the present disclosure.

In step S112, the braking torque at the auxiliary pump 210 is transmitted to the engine 105 via the driveline, to thereby bias the engine to operate at a decreased rotation speed.

It will be understood that steps S110 and S112 may be performed using a single auxiliary hydraulic system 208, or by simultaneously or sequentially activating the auxiliary hydraulic components of multiple auxiliary hydraulic systems 208 to obtain a variable or progressively-increasing braking torque.

The method may be performed manually by a vehicle operator, automatically by a control system, or by a combination of manual and automatic operations. For example, an operator may manually observe that an overspeed condition is present or likely to occur, and then initiate an automated sequence of steps to generate a braking torque to prevent or mitigate the overspeed condition.

An automated or semi-automated system may use any suitable control system 222 to effectuate the method. For example, the control system 22 may comprise a computer having a processor and a memory that stores non-transient instructions that, when executed by the processor, control the vehicle 100 to perform steps of the method. In the shown example, the control system 222 includes various sensing and control circuits (shown as dashed lines), including an engine speed sensor circuit, a bypass valve control circuit, a shutoff valve control circuit, and an auxiliary clutch control circuit. In other cases, more or fewer sensor and control circuits may be used.

Figure 4:
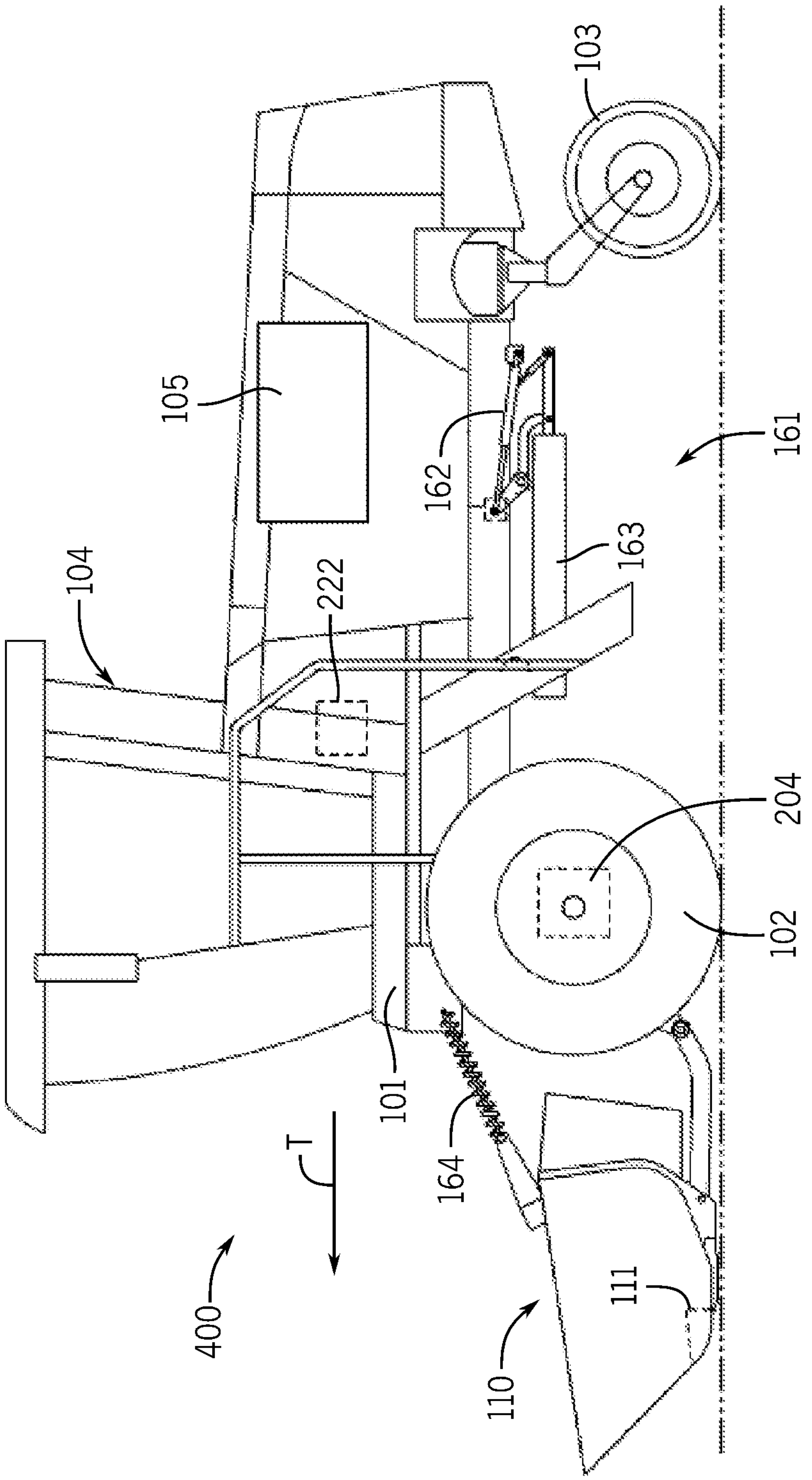
FIG. 4 is a schematic side view of a second agricultural vehicle incorporating embodiments of a control system configured to operate the method for controlling engine overspeed.

Embodiments such as described herein may be used in any variety of agricultural equipment. The combine shown in FIG. 1, provides one example. Another example is shown in FIG. 4 as a self-propelled windrower 400. A typical self-propelled windrower 400 is used for harvesting a crop material as it travels across the ground in the direction indicated by arrow "T." The windrower 400 includes a power plant, such as a diesel engine 105, which pushes a header 110 that severs the crop material from the ground, usually by a sickle-bar, rotary cutter or other functionally equivalent cutter 111.

The windrower 400 has a chassis 101 for supporting various components of the windrower 400, including an operator cab 104 from which the operator controls the windrower operation, a set of transversely spaced-apart drive wheels 102 and their associated motors 204 for propelling the windrower 400 across the ground, and one or more rear wheels 103 in the form of castors which allow the windrower 400 to turn as the drive wheels 102 are differentially driven. The heater 110 is also supported on the chassis 101, and one or more hydraulic header actuators 164 may be provided to selectively control the height of the header 110 relative to the chassis 101.

The cut crop falls rearwardly from the cutter 111 into the header 110, and is urged toward the center of the header 110 where it may be conditioned prior to discharge from the header 110, as known in the art. The crop is then ejected rearwardly from the header 110, generally in the space between the drive wheels 102 whereupon it falls to the ground. Shields (not shown) are used to arrange the crop into a windrow that is formed generally along the longitudinal axis of the windrower 400.

The windrower 400 also includes a merger system 161 which is disposed under chassis 101 for directing crop material being discharged from header 110 to a location laterally displaced from the longitudinal centerline of the windrower 40. In this manner, windrows of harvested crop material may be positioned for merging with the harvested crop material from a previous separate pass by the windrower 400, usually when the windrower 400 travels in the opposite direction along an adjacent path. The merger system 161 has an actuator 162 to raise and lower the merger frame 163 to selectively position the merger system 161 in a working position for the windrow merging operation, and also in a non-working position for forming windrows that trail behind generally along the windrower longitudinal centerline. Details of merger systems 161 are generally known in the art, and need not be described further herein.

The windrower 400 also includes a control system 222, such as described herein. In this example, the merger system actuator 162, header actuators 164, and other hydraulic systems, may used as driven auxiliary mechanisms 212 by the control system 222 (either fully automatically or with operator input) to perform methods to control overspeed of the wheel drive motors 204, as explained herein. Other alternatives and embodiments will be apparent to persons of ordinary skill in the art in view of the present disclosure.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural vehicle comprising:
a chassis;
an engine mounted to the chassis;
at least one ground drive system comprising:
a respective ground drive pump configured to be driven by the engine,
one or more respective ground drive assemblies configured to support and selectively drive the chassis on a ground surface, each respective ground drive assembly comprising a respective drive wheel and a respective drive wheel motor, and
a respective hydraulic ground drive circuit configured to convey hydraulic fluid between the respective ground drive pump and the respective drive wheel motor;
at least one auxiliary hydraulic system comprising:
a respective auxiliary pump configured to be driven by the engine,
a respective driven auxiliary mechanism configured to be operated by the respective auxiliary pump,
a respective auxiliary hydraulic circuit configured to convey a respective auxiliary flow of hydraulic fluid between the respective auxiliary pump and the respective driven auxiliary mechanism, and
a respective auxiliary hydraulic component located in the auxiliary hydraulic circuit;
at least one driveline configured to mechanically connect the engine to each respective ground drive pump and each respective auxiliary pump, and the driveline comprises a gearbox having an input connected to the engine, a first output connected to each respective ground drive pump, and a second output connected to each respective auxiliary pump; and
a control system comprising a processor and a memory that stores non-transient instructions that, when executed by the processor, control the vehicle to:
measure an engine rotation speed;
compare the engine rotation speed to a threshold value; and
upon determining that the engine rotation speed satisfies the threshold value:
operate the respective auxiliary hydraulic component of at least one auxiliary hydraulic system to generate a respective braking torque at the respective auxiliary pump, and
transmit each respective braking torque to the engine to bias the engine to operate at a decreased rotation speed.

2. The agricultural vehicle of claim 1, wherein the driveline does not include a clutch between the engine and each respective ground drive pump.

3. The agricultural vehicle of claim 1, wherein operating the respective auxiliary hydraulic component of the at least one auxiliary hydraulic system comprises reconfiguring the respective auxiliary hydraulic circuit to direct hydraulic flow through the respective auxiliary hydraulic component.

4. The agricultural vehicle of claim 1, wherein:
the respective auxiliary pump of at least one auxiliary hydraulic system is connected to the engine by a clutch on the second output of the at least one driveline; and
operating the respective auxiliary hydraulic component of the at least one auxiliary hydraulic system comprises engaging the clutch to cause the respective auxiliary pump to rotate in unison with the engine.

5. The agricultural vehicle of claim 1, wherein:
the respective auxiliary pump of at least one auxiliary hydraulic system is connected to the engine by a clutch on the second output of the at least one driveline; and
operating the respective auxiliary hydraulic component of the at least one auxiliary hydraulic system comprises:
engaging the clutch to cause the respective auxiliary pump to rotate in unison with the engine, and
reconfiguring the respective auxiliary hydraulic circuit to direct hydraulic flow through the respective auxiliary hydraulic component.

6. The agricultural vehicle of claim 1, wherein the respective auxiliary hydraulic component comprises a pressure relief valve.

7. The agricultural vehicle of claim 1, wherein, in at least one auxiliary hydraulic system:
the respective auxiliary hydraulic circuit comprises:
a delivery line connected between an output of the auxiliary pump and an input of the driven auxiliary mechanism,
a return line connected between an input of the auxiliary pump and an output of the driven auxiliary mechanism,
a bypass valve located between the delivery line and the return line in fluid parallel with the driven auxiliary mechanism, wherein the bypass valve is movable between a respective open position in which pressurized hydraulic fluid in the delivery line is diverted to the return line to thereby disable operation of the driven auxiliary mechanism, and a respective closed position in which pressurized hydraulic fluid in the delivery line is not diverted to the return line to thereby enable operation of the driven auxiliary mechanism, and
a control valve located in series between the auxiliary pump and the driven auxiliary mechanism, and movable between a respective closed position in which the control valve prevents hydraulic fluid from passing from the auxiliary pump to the driven auxiliary mechanism, and a respective open position in which the control valve allows hydraulic fluid to pass from the auxiliary pump to the driven auxiliary mechanism; and the respective auxiliary hydraulic component comprises a pressure relief valve located between the delivery line and the return line.

8. The agricultural vehicle of claim 7, wherein operating the respective auxiliary hydraulic component of the at least one auxiliary hydraulic system comprises placing the bypass valve in the closed position, and placing the control valve in the closed position, to thereby direct hydraulic fluid from the delivery line through the pressure relief valve to the return line.

9. The agricultural vehicle of claim 1, wherein the agricultural vehicle comprises a windrower or a combine and the respective driven auxiliary mechanism is one of a feeder housing actuator, a hydraulic motor connected to drive an infeed belt of the agricultural vehicle, a hydraulic motor connected to drive an auger of the agricultural vehicle, or a hydraulic motor connected to drive a thresher of the agricultural vehicle.

10. The agricultural vehicle of claim 1, wherein the respective ground drive pump is fluidly connected to the respective drive wheel motor, wherein the respective auxiliary pump is fluidly connected to the respective driven auxiliary mechanism, wherein the respective auxiliary pump is not fluidly connected to the respective drive wheel motor, and wherein the respective ground drive pump is not fluidly connected to the respective driven auxiliary mechanism.

11. The agricultural vehicle of claim 1, wherein the first output connected to each respective ground drive pump does not include a clutch, and the second output connected to each respective auxiliary pump includes a clutch for selectively driving the respective auxiliary pump.

* * * * *